United States Patent
Bither, Jr. et al.

[11] 3,911,085
[45] Oct. 7, 1975

[54] LITHIUM HALOBORACITES

[75] Inventors: Tom Allen Bither, Jr.; Wolfgang Karl Jeitschko, both of Wilmington, Del.

[73] Assignee: E. I. Du Pont de Nemours and Company, Wilmington, Del.

[22] Filed: Oct. 23, 1973

[21] Appl. No.: 408,278

[52] U.S. Cl. .............................. 423/277; 136/153
[51] Int. Cl. ....................................... C01b 35/00
[58] Field of Search ................... 423/277; 136/153

[56] References Cited
UNITED STATES PATENTS
3,384,447  5/1968  Schmid ............................... 423/277

OTHER PUBLICATIONS

Z. Naturforsch, (Jeitschko et al.), 27b, p. 1423, 1972.
Mat. Res. Bull., (Levasseur et al.), Vol. 6, pp. 15–22, (1971).

*Primary Examiner*—John H. Mack
*Assistant Examiner*—H. A. Feeley

[57] ABSTRACT

Lithium haloboracites of the formula $Li_4B_7O_{12}X$ where X is Cl, Br, I or a mixture thereof are useful as solid electrolytes for galvanic cells. Preferred lithium haloboracites are those in which X is a mixture of Br and Cl where Br is 20 to 50 mole percent of X.

4 Claims, 4 Drawing Figures

LITHIUM HALOBORACITES

BACKGROUND OF THE INVENTION

1. Field of the Invention

This invention relates to lithium haloboracites and to their use as solid electrolytes in galvanic cells.

2. Description of the Prior Art

Li has long been regarded as a desirable component of galvanic cells. Its unparalleled reduction potential ($E_{red}° = -3.024v$) and its light weight have often suggested its use as the anodic component in high energy-density batteries. Its reactivity with water has required the use of non-aqueous electrolytes such as organic-soluble lithium perchlorates, or fused lithium halides usable only at high temperature.

Solid electrolytes and in particular completely solid state galvanic cells offer special possibility for long shelf life, broad temperature limits of operability and miniaturization. The requirement for good ionic transport and very low electronic conductivity has led primarily to the use of various silver halides as solid electrolytes. The relatively low electrochemical potential of $Ag/Ag+$ and the relatively high density and cost are disadvantages. Alternatives to the solid state transport of $Ag^+$ are the more recent discovery of transport by alkali metal cations in beta-aluminas and anion transport in calcia-stabilized zirconia at very high temperatures.

Two lithium haloboracites of the formula $Li_4B_7O_{12}Cl$ and $Li_4B_7O_{12}Br$ have been previously reported by Lavasseur et al. in Mater. Res. Bull. 6, 15–22 (1971); and by Jeitschko et al. in Z. Naturforsch, 27b, 1423 (Nov. 1972). They were described as related to the well-known boracites of divalent metals typified by the mineral boracite, $Mg_3B_7O_{13}Cl$. No mention is made of mixed halogen phases or electrical properties.

SUMMARY OF THE INVENTION

This invention relates to the discovery that lithium haloboracites of the formula $Li_4B_7O_{12}X$ wherein X is Cl, Br, I or mixtures thereof are useful as solid electrolytes. More particularly, this invention provides a device for transporting lithium ions which comprises (a) means for supplying lithium ions, (b) means for removing lithium ions, said means for supplying and removing lithium ions being separated by (c) a solid electrolyte consisting essentially of a lithium haloboracite $Li_4B_7O_{12}X$ where X is Cl, Br, I or a mixture thereof, and (d) electrode means to complete an electrical circuit between said supply and said removal means.

This invention also relates to novel lithium haloboracites of the formula $Li_4B_7O_{12}X$ wherein X is $I_{1-m}Br_m$ where $m$ is 0 to 0.5 or X is $Cl_{1-n}Br_n$ where $n$ is 0.2 to 0.5.

DETAILED DESCRIPTION OF THE INVENTION

Figure 1:
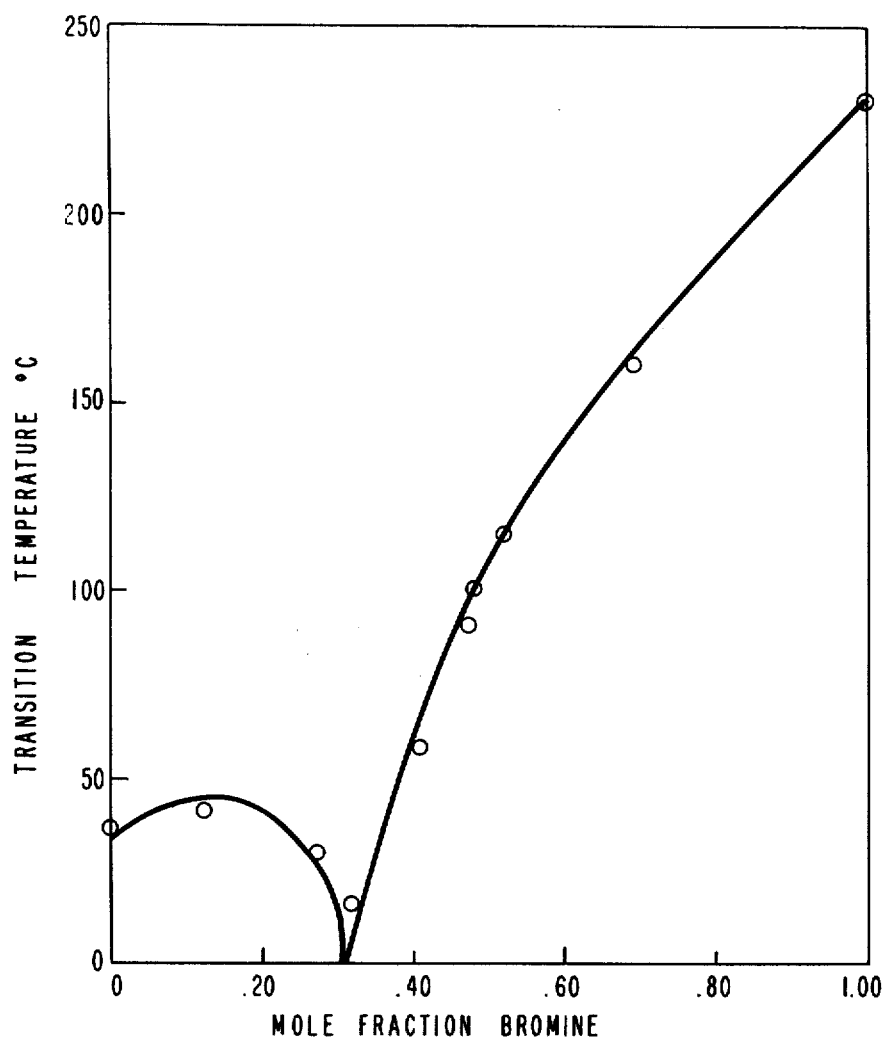

The lithium haloboracites used in accordance with this invention are crystalline solids in which unusual ionic conductivity has been found to occur. We have discovered that the lithium ions in these haloboracites, unlike the divalent metal ions in ordinary haloboracites, are quite mobile and permit substantial ionic conductivity, especially at slightly elevated temperatures. Moreover, the novel haloboracites of the formula $Li_4B_7O_{12}Cl_{1-n}Br_n$ where $n$ is 0.2 to 0.5 exhibit unusually high $Li^+$ mobility at unexpectedly low temperatures.

The use of lithium haloboracites as solid electrolytes makes possible for example a primary galvanic cell to provide a lightweight source of stable voltage for low current drain at ambient temperatures. In other applications the lithium haloboracite solid electrolytes may be used at higher temperatures with correspondingly higher conductivity in a lightweight power source employing for example liquid lithium anodes. In still other applications the lithium haloboracites may be used as a diaphragm in the electrolytic preparation of lithium metal.

PREPARATION OF $Li_4B_7O_{12}X$

The known compositions $Li_4B_7O_{12}Cl$ and $Li_4B_7O_{12}Br$ can be obtained in the form of microcrystalline powders by heating at about 650°C mixtures of $B_2O_3/Li_2O$ in molar ratios from about 7/4 to about 7/2 in an excess of the fused salts, LiCl or LiBr. The method does not appear to work with LiI. The haloboracite compounds can be separated from other components of the reactant mixture by washing with water in which the lithium haloboracites are relatively insoluble. Their identity and purity can be determined by analysis and from the characteristic x-ray diffraction patterns.

To obtain the lithium haloboracites as clear crystals of macroscopic size it is preferred to use hydrothermal methods to promote crystal growth. For the chloro- and bromo-boracites a pressure of about 3 kbar suffices (1 kbar is $10^9$ dynes/cm² or about 1000 atmospheres), while for iodo-boracites higher pressures of about 30 kbar are used. After contact of the reactants for several hours at about 700°C. under pressure the mixture should be slowly cooled (e.g., 10°–30°C. per hour) for at least about 8 hours in order to prolong conditions for crystal growth.

Reactions at 3 kbars are conveniently carried out by sealing the appropriate reactants into gold tubes. These tubes are then placed in a bomb, pressured with argon, and heated. The argon pressure and bomb temperature are adjusted to give the desired reaction conditions. Reactions under higher pressure may be carried out in a piston-cylinder device like that described by Boyd and England in J. Geophys. Res., 65, 741–8 (1960) where the reactants are sealed in a container made of platinum or gold tubing.

Boric oxide and boric acid are acceptable sources of boron, while lithium oxide or hydroxide can provide a source of lithium in addition to the appropriate lithium halides. Alternatively, lithium borates may be used as a source of both lithium and boron. The atomic ratio Li/B in the starting mixture may depart somewhat from the theoretical 0.57, for example it may be from about 0.33 to about 0.66. Similarly the ratio X/B (theory 0.14) may range from about 0.12 to about 0.5. A small amount of water for example sufficient to provide a $H_2O/B$ ratio of about 0.2–0.5, is useful to provide good hydrothermal growth conditions. Water is conveniently added as a hydrate of one of the reactants. It will be appreciated that small changes in acidity may vary solubility relations in the aqueous growth media.

When lithium boracites with mixed halogens are prepared the proportion of the various halogens in the product is determined principally by their respective proportions in the starting mixture. With the mixed halogens Cl and Br there is a tendency for a larger proportion of the smaller halogen, Cl, to be incorporated in the product. The proportion of two halides in the product may be determined by analysis. The proportion may also be inferred in accordance with Vegard's law from the unit cell dimension relative to those of the end members, i.e., the pure lithium haloboracites with a single halogen which form the solid solution containing mixed halides.

STRUCTURE OF $Li_4B_7O_{12}X$

The identity of the lithium haloboracites can be determined from characteristic x-ray diffraction patterns. The Hagg-Guinier powder patterns may be indexed on the basis of a cubic lattice with unit cell dimension $a = 12.144$A for $Li_4B_7O_{12}Cl$ and $a = 12.190$A for $Li_4B_7O_{12}Br$ as described in the Levasseur et al. reference previously cited. We have found that the new analogue $Li_4B_7O_{12}I$ has a similar cubic pattern with $a = 12.273$A and that the mixed Cl-Br and Br-I compositions form solid solutions with unit cell dimensions between those of the respective end-members of each series.

Despite the apparently successful assignment of cubic structure, optical examination of lithium haloboracite crystals under polarized light shows them to be anisotropic at room temperature, that is, their optical properties vary depending on the direction in which they are observed. Critical examination of the Hagg-Guinier power patterns of these compounds shows some resolved line splitting in the x-ray films for $Li_4B_7O_{12}Br$ and from the splitting character and intensity distribution, rhombohedral symmetry is indicated. A least-squares refinement of the resolved lines gives the rhombohedral cell dimensions $a = 12.187$A, $\alpha = 90.07$A. Thus, at room temperature the structure of each has a symmetry lower than cubic indicating that they exist in a slightly distorted version of a higher temperature prototype cubic structure which is optically isotropic and piezoelectric.

The transition between the distorted pseudocubic phase at low temperature and the high temperature cubic phase may be observed optically using polarized light on a hot stage microscope. The temperature of transition may also be found by differential scanning calorimetry. Structural distinctions between the high- and low-temperature forms and their consequences are illustrated below for the case of $Li_4B_7O_{12}Cl$.

The transition temperature of solid solutions of the haloboracites is generally between those of its component haloboracites. However, substitution of bromine for chlorine in $Li_4B_7O_{12}Cl$ first causes a surprising lowering of the transition before the expected trend toward the much higher transition of $Li_4B_7O_{12}Br$ takes over after about one third substitution by bromine. While $Li_4B_7O_{12}Cl$ is normally in its low temperature, optically anisotropic form at room temperature, its transition from the high temperature cubic form may be sluggish upon cooling. By means of the slight substitution of bromine for chlorine the isotropic form may be further stabilized at room temperature. The unexpected variation of transition temperature with composition is shown in FIG. 1, where the mole fraction of bromine is determined from the regular variation in lattice constant of the cubic or pseudo-cubic structures. It is clear from this figure that the benefits of the more conductive, cubic structure can be extended to a most useful temperature range by substituting bromine for chlorine to the extent of 20–50 atom percent.

X-ray studies of these lithium haloboracites carried out at room temperature and elevated temperatures show that lithium occupies two crystallographic sites which are close to each other. This makes available channels for the migration of Li ions in all three dimensions. The occupancy of the two sites changes with temperature thus indicating that migration indeed does happen from one site to the other.

ELECTRICAL PROPERTIES OF $Li_4B_7O_{12}X$

The indications of ionic mobility provided by crystallographic studies are borne out by electrical measurements. Single crystals of the lithium haloboracites were electroded using either a commercial silver paste or gold sputtering. Conductance and capacitance of the crystals were measured using an automatic capacitance bridge (Hewlett Packard model 4270A) at frequencies ranging from $10^3$ to $10^6$ Hertz. Data were usually taken continuously at increasing temperature after first cooling to liquid nitrogen temperature. The $Li_4B_7O_{12}X$ crystals all showed unusually high a.c. conductivity particularly at temperatures above the pseudo-cubic to cubic transition. A marked increase in the a.c. conductivity occurs at the temperature of transition.

Figure 2:
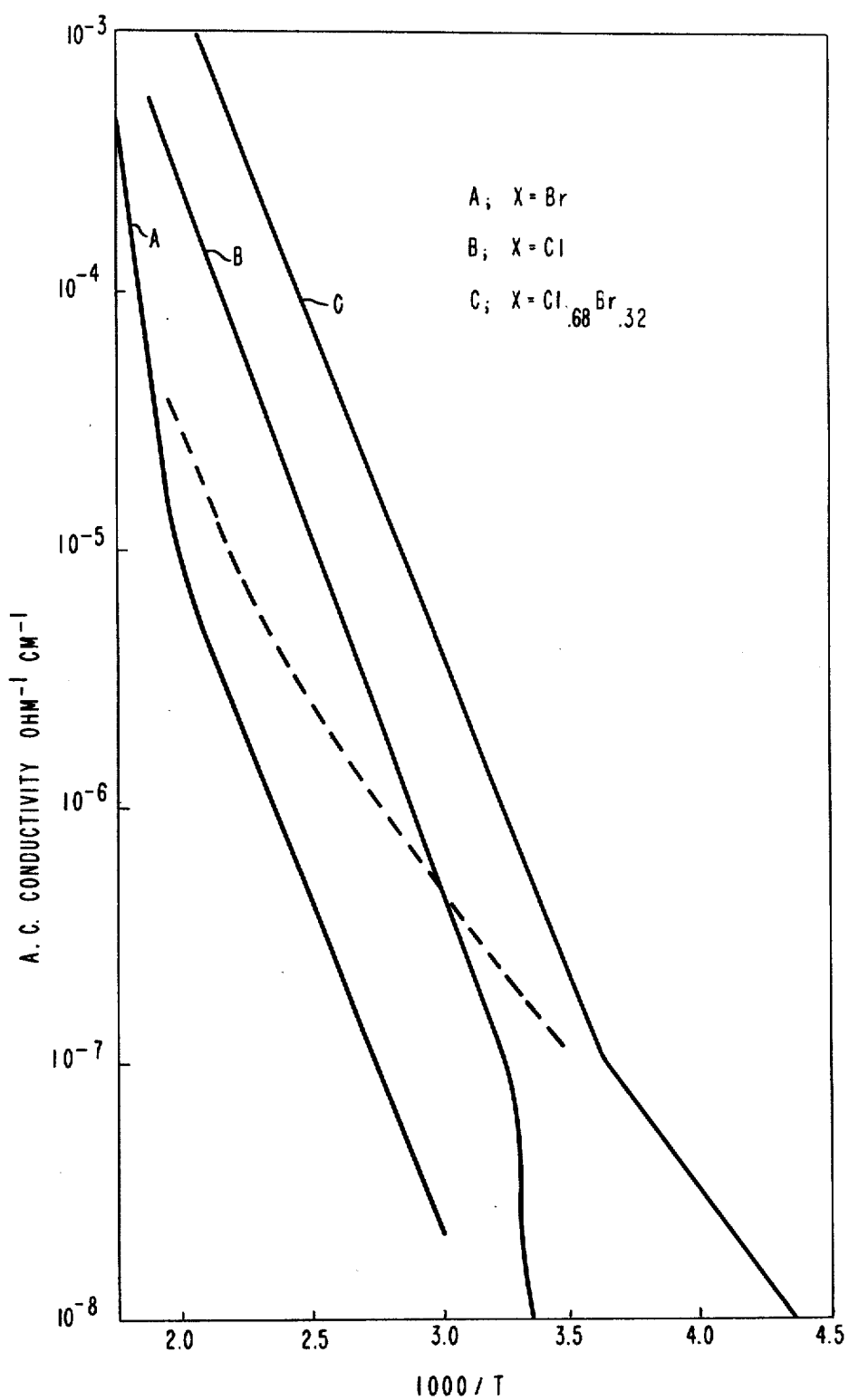

Typical results of conductivity (measured at a frequency of $10^5$ Hertz) versus the reciprocal of absolute temperature (1000/T) are shown in FIG. 2 where curve A represents data for $Li_4B_7O_{12}Br$, curve B for $Li_4B_7O_{12}Cl$, and curve C for $Li_4B_7O_{12}Cl_{0.68}Br_{0.32}$. The dashed curve represents data for lithium iodide, a well-known ionic conductor used commercially. All of the lithium haloboracites have useful conductivities, but those compositions $Li_4B_7O_{12}Cl_{1-n}Br_n$ where n has values between 0.20 and 0.50 are preferred because of unusually high conductivity particularly at room temperature. The effect of frequency on a.c. conductivity is moderate below the transition temperature, increasing by a factor of about $25x$ as frequency increases from $10^3$ to $10^6$ Hz. Above the transition temperature, frequency is even less influential causing only about a $5x$ increase in conductivity over the same range.

Figure 3:
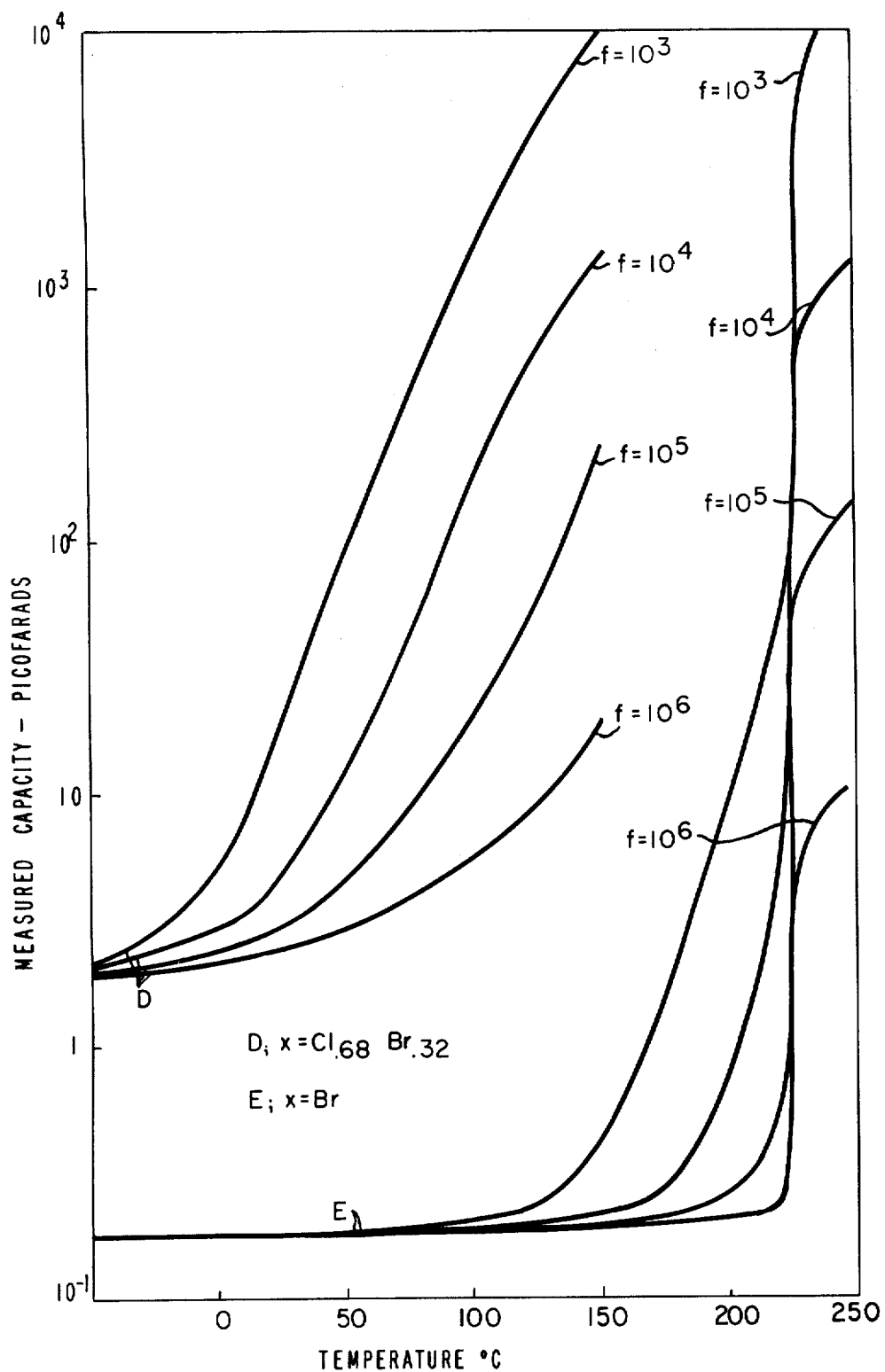

The ionic character of the conduction process is further indicated by the change of capacitance with frequency. Well below the transition temperature the measured capacitance is frequency independent, but above the transition temperature it is inversely proportional to the frequency, decreasing by 3 orders of magnitude over the range $10^3$–$10^6$ Hz. FIG. 3 shows capacitance vs. temperature for crystals of $Li_4B_7O_{12}Cl_{0.68}Br_{0.32}$ (curves D) and $Li_4B_7O_{12}Br$ (curves E) at various frequencies, f.

The ionic conductivity may be directly demonstrated by the use of lithium haloboracite crystals to separate anodic and cathodic compartments in galvanic devices. Examples 20 and 21 illustrate their use in low power, primary voltage sources particularly adapted for convenient use at room temperature. The slope of the lines in FIG. 2, indicating an activation energy of about 0.6 electron volts, suggests utility as a power source at elevated temperatures, particularly above 300°C. where the ionic conductivity approaches that of the best known solid electrolytes.

It is also contemplated that the lithium haloboracites may be used in electrolytic devices wherein for example they may be arranged as a membrane across which a potential may be applied in order to selectively transport lithium. Thus, for example, lithium haloboracites may be used as separators to purify lithium from mixtures with other alkali metals or their ions.

EXAMPLES

The following examples, illustrating the preparation of lithium haloboracites and in particular the novel lithium haloboracites of this invention and their use as solid electrolytes are given without any intention that the invention be limited thereto.

EXAMPLE 1

A mixture of 0.551 g. LiCl (13 mmoles), 0.932 g. LiOH·H$_2$O (22 mmols), and 3.627 g. B$_2$O$_3$ (52 mmols) was sealed into a ½ inch I.D. gold tube about 5 inches in length. This tube was maintained for 4 hours at a temperature of 700°C under an external argon pressure of approximately 3 kbars, was then slowly cooled at a rate of approximately 25°C/Hr. The resultant solids were extracted with water to remove soluble impurities and clear, colorless, polyhedral crystals of variable size up to several mm. across were isolated. X-ray diffraction powder data obtained with a Hagg-Guinier camera upon these crystals indicated the pattern of the boracite-type compound Li$_4$B$_7$O$_{12}$Cl which could be indexed on the basis of a cubic cell of unit dimension $a$ = 12.144A.

Optical examination of these crystals under polarized light showed that they were anisotropic at room temperature but became isotropic upon gentle warming. By differential scanning calorimetry, two endotherms peaking around 37° and 75°C. were observed on upheat. Upon cool down, the upper transition was rapidly reversible, but the lower transition was sluggish. The change from optical anisotropy to isotropy accompanied the lower of the two transitions. By differential thermal analysis, the onset of decomposition of Li$_4$B$_7$O$_{12}$Cl was observed at a temperature around 870°C.

EXAMPLE 2

A mixture of 0.721 g. LiCl (17 mmols), 1.458 g. LiBO$_2$·2H$_2$O (17 mmols), 1.785 g. B$_2$O$_3$ (25 mmols), and 1.054 g. H$_3$BO$_3$ (17 mmols) was sealed into a ½ inch I.D. gold tube about 5 inches in length and reacted as in Example 1. The resultant solids were extracted with water to remove soluble impurities and a mixture of crystals, some clear and some having a crazed appearance and having growth habits varying from pseudocubes to polyhedra to platelets up to several mm. across, was isolated. X-ray diffraction powder data indicated this mixture of crystal habits to have the pattern of the boracite-type compound, Li$_4$B$_7$O$_{12}$Cl, described in Example 1. Analysis on these crystals confirmed the composition, Li$_4$B$_7$O$_{12}$Cl.

Calculated: Li = 8.39; B = 22.87; O = 58.03; Cl = 10.71

Found: Li = 8.05; B = 23.40; O = 58.62; Cl = 10.57

The crystals were optically anisotropic, but became isotropic after gently warming on a hot plate. After standing without heat for two hours the crystals slowly began to exhibit anisotropic behavior.

EXAMPLE 3

A mixture of 0.848 g. LiCl (20 mmols), 0.858 g. LiBO$_2$·2H$_2$O (10 mmols), 1.050 g. B$_2$O$_3$ (15 mmols), and 0.620 g. H$_3$BO$_3$ (10 mmols) was sealed into a ⅜ inch I.D. gold tube about 5 inches in length and reacted in a manner similar to that described in Example 2. The resultant solids were extracted with water to remove soluble impurities. A mixture of crystals was obtained similar in appearance to that obtained in Example 2 and having the x-ray diffraction powder pattern of Li$_4$B$_7$O$_{12}$Cl as observed in Examples 1 and 2. Analysis indicated 8.05% Li and 58.62% O.

An infrared spectrum showed the presence of trigonally- and tetrahedrally-coordinated boron, both of which are present in the boron-oxygen network of the boracite structure. No bands indicating the presence of OH or H$_2$O were observed. These crystals of Li$_4$B$_7$O$_{12}$Cl were observed to give a strong positive test for piezoelectricity when examined with a transmission-type piezoelectricity detector. The a.c. conductivity of a crystal is shown in FIG. 2, curve B.

EXAMPLE 4

A mixture of 1.300 g. LiBr (15 mmoles), 1.260 g. LiOH·H$_2$O (30 mmoles), and 4.200 g. B$_2$O$_3$ (60 mmoles) was reacted in a sealed gold tube at 700°C and 3 kbars pressure using the procedure of Example 1. The resultant solids were extracted with water to remove soluble impurities and crystals up to several mm. across having clear to crazed appearances and generally a cubic-like growth habit were isolated with some irregularly shaped, clear shards which proved to be Li$_2$B$_4$O$_7$. X-ray diffraction powder data obtained with a Hagg-Guinier camera upon crystals of cubic-like growth habit indicated the pattern of the boracite-type compound Li$_4$B$_7$O$_{12}$Br which could be indexed on the basis of a cubic cell of unit dimension $a$ = 12.190A. Critical examination of these x-ray films showed some resolved line splitting and from the splitting character and intensity distribution, rhombohedral symmetry was indicated. A least-squares refinement of the resolved lines gave $a$ = 12.187A $\alpha$ = 90.07°.

Optical examination confirmed the anisotropy of Li$_4$B$_7$O$_{12}$Br at room temperature and differential scanning calorimetry on crystals of cubic-like habit showed the presence of a single reversible transition that exhibited a sharp endotherm on upheat peaking around 227°–232°C. This Li$_4$B$_7$O$_{12}$Br boracite differs from Li$_4$B$_7$O$_{12}$Cl in that only one rather than two transitions are obtained upon heating from room temperature to the high temperature cubic form. Crystals of Li$_4$B$_7$O$_{12}$Br gave a strong positive test for piezoelectricity when examined with a transmission-type piezoelectricity detector. Conductivity and dielectric properties of a crystal are shown in FIG. 2, curve A, and FIG. 3, curve B, respectively.

EXAMPLE 5

A mixture of 1.285 g. LiBr (14.8 mmoles), 1.269 g LiBO$_2$·2H$_2$O (14.8 mmoles), 1.554 g. B$_2$O$_3$ (22.2 mmoles), and 0.918 g. H$_3$BO$_3$ (14.8 mmoles) was reacted using the procedure of Example 4 except that the product was slowly cooled to a temperature of about 100°C. The resulting Li$_4$B$_7$O$_{12}$Br was isolated as described in Example 4.

EXAMPLE 6

A mixture of 1.181 g. LiBr (13.6 mmoles), 0.583 g. LiBO$_2$·2H$_2$O (6.8 mmoles), 0.714 g. B$_2$O$_3$ (10.2 mmoles), and 0.422 g. H$_3$BO$_3$ (6.8 mmoles) was reacted using the procedure of Example 4 except that the product was slowly cooled to a temperature of about 100°C. The resulting Li$_4$B$_7$O$_{12}$Br was isolated as described in Example 4.

EXAMPLE 7

A 0.806 g. pellet made from a mixture of 1.606 g. LiI (12 mmols), 0.515 g. $LiBO_2 \cdot 2H_2O$ (6 mmols), 0.630 g. $B_2O_3$ (9 mmols), and 0.372 g. $H_3BO_3$ (6 mmols) and contained in a welded Pt capsule was pressured to 30 kbars in a piston-cylinder device, heated for 4 hours at about 700°C, slow cooled for 11 hours to about 560°C, and quenched to room temperature. Following extraction of this reaction product with water and then acetone, hazy, colorless crystals of cubic-like habit were isolated. X-ray diffraction powder data obtained with a Hagg-Guinier camera upon these crystals showed a boracite-type pattern (Table I) isotypic with that for $Li_4B_7O_{12}Cl$, thus indicating formation of the new compound $Li_4B_7O_{12}I$. These x-ray data could be indexed on the basis of a cubic cell of unit dimension $a = 12.273 A$.

Optical examination of these crystals showed them to be anisotropic at room temperature, and differential scanning calorimetry showed the presence of a single reversible transition that exhibited a sharp endotherm on upheat peaking around 270°C. Crystals of $Li_4b_7O_{12}I$ gave a strong positive test for piezoelectricity when examined with a transmission type piezoelectricity detector.

TABLE I

X-Ray Diffraction Powder Pattern of $Li_4B_7O_{12}I$

| Intensity* | h | k | l | d Spacing, A |
|---|---|---|---|---|
| 50 | 2 | 0 | 0 | 6.1377 |
| 70 | 2 | 2 | 0 | 4.3395 |
| 100 | 2 | 2 | 2 | 3.5437 |
| 60 | 4 | 0 | 0 | 3.0683 |
| 100 | 4 | 2 | 0 | 2.7447 |
| 95 | 4 | 2 | 2 | 2.5053 |
| 50 | 4 | 4 | 0 | 2.1698 |
| 70 | 5 | 3 | 1 | 2.0747 |
| 60 | 6 | 0 | 0 | 2.0458 |
| 60 | 6 | 2 | 0 | 1.9407 |
| 40 | 6 | 2 | 2 | 1.8505 |
| 30 | 4 | 4 | 4 | 1.7717 |
| 50 | 6 | 4 | 0 | 1.7020 |
| 70 | 6 | 4 | 2 | 1.6400 |
| 10 | 7 | 3 | 1 | 1.5976 |
| 20 | 8 | 0 | 0 | 1.5341 |
| 70 | 8 | 2 | 0 | 1.4884 |
| 30 | 6 | 6 | 0 | 1.4463 |
| 10 | 7 | 5 | 1 | 1.4165 |
| 20 | 8 | 4 | 0 | 1.3720 |
| 30 | 8 | 4 | 2 | 1.3389 |
| 5 | 6 | 6 | 4 | 1.3080 |

*An intensity value of 100 is assigned to the strongest lines of the pattern.

EXAMPLE 8

A mixture of 0.276 g. LiCl (6.51 mmol), 0.566 g. LiBr (6.52 mmol), 1.110 g. $LiOH \cdot H_2O$ (26.46 mmol), and 3.627 g. $B_2O_3$ (51.81 mmol) was sealed into a ½ inch I.D. gold tube about 5 inches long and was reacted in the manner of Example 1. Following extraction of the resultant solids with water, opaque to clear polyhedral crystals were isolated. A Debye-Scherrer x-ray diffraction powder pattern obtained on these crystals showed them to be isotypic with the boracite-type compounds $Li_4B_7O_{12}Cl$ and $Li_4B_7O_{12}Br$ of Examples 1–7. This pattern (Table II) could be indexed on the basis of a face-centered cubic cell of unit dimension $a = 12.159A$ and indicates formation of a mixed chloro-bromo lithium boracite, $Li_4B_7O_{12}(Cl, Br)$, intermediate between the two end members of cell size $a_{Cl} = 12.144A$ and $a_{Br} = 12.190A$. Based on a linear variation of cell constant with composition according to Vegard's law the composition is $Li_4B_7O_{12}Cl_{0.68}Br_{0.32}$.

In contrast (1) to $Li_4B_7O_{12}Cl$ which is anisotropic at room temperature and shows two transitions upon heating, and (2) to $Li_4B_7O_{12}Br$ which is also anisotropic at room temperature and shows one transition upon heating, crystals of this mixed chloro-bromo lithium boracite were essentially all isotropic at room temperature and showed no transition by differential scanning calorimetry when examined over the temperature range −110° to +550°C.

TABLE II

X-Ray Diffraction Powder Pattern of The Mixed Halogen $Li_4B_7O_{12}(Cl,Br)$ Prepared in Example 8

| Intensity* | h | k | l | d Spacing, A |
|---|---|---|---|---|
| 25 | 2 | 0 | 0 | 6.0978 |
| 95 | 2 | 2 | 2 | 3.5143 |
| 30 | 4 | 0 | 0 | 3.0416 |
| 95 | 4 | 2 | 0 | 2.7205 |
| 80 | 4 | 2 | 2 | 2.4834 |
| 50 | 4 | 4 | 0 | 2.1495 |
| 100 | 5 | 3 | 1 | 2.0558 |
| 10 | 6 | 0 | 0 | 2.0276 |
| 30 | 6 | 2 | 0 | 1.9225 |
| 10 | 6 | 2 | 2 | 1.8331 |
| 30 | 4 | 4 | 4 | 1.7549 |
| 40 | 6 | 4 | 0 | 1.6861 |
| 50 | 6 | 4 | 2 | 1.6248 |
| 35 | 7 | 3 | 1 | 1.5828 |
| 10 | 8 | 0 | 0 | 1.5192 |
| 50 | 8 | 2 | 0 | 1.4743 |
| 20 | 7 | 5 | 1 | 1.4042 |
| 20 | 6 | 6 | 2 | 1.3944 |
| 10 | 8 | 4 | 0 | 1.3590 |
| 10 | 9 | 1 | 1 | 1.3357 |
| 10 | 8 | 4 | 2 | 1.3266 |
| 10 | 6 | 6 | 4 | 1.2953 |
| 15 | 9 | 3 | 1 | 1.2742 |
| 40 | 8 | 4 | 4 | 1.2409 |
| 5 | 10 | 0 | 0 | 1.2153 |
| 25 | 10 | 2 | 0 | 1.1922 |
| 30 | 10 | 2 | 2 | 1.1699 |
| 10 | 10 | 4 | 0 | 1.1291 |
| 2 | 8 | 8 | 0 | 1.0749 |
| 10 | 11 | 3 | 1 | 1.0623 |
| 10 | 8 | 8 | 2 | 1.0578 |
| 15 | 10 | 6 | 0 | 1.0422 |
| 10 | 11 | 3 | 3 | 1.0306 |
| 20 | 10 | 6 | 2 | 1.0274 |
| 20 | 12 | 0 | 0 | 1.0130 |
| 10 | 11 | 5 | 1 | 1.0034 |

*An intensity value of 100 is assigned to the strongest line of the pattern.

EXAMPLE 9

A mixture of 0.361 g. LiCl (8.51 mmol), 0.739 g. LiBr (0.851 mmol), 1.458 g. $LiBO_2 \cdot 2H_2O$ (17.0 mmol), 1.785 g. $B_2O_3$ (25.5 mmol), and 1.054 g. $H_3BO_3$ (17.0 mmol) was sealed into a ½ inch I.D. gold tube aboutu 5 inches long and was reacted in the manner of Example 2. Crystals of cubelike growth habit were isolated. X-ray diffraction powder data were essentially the same as those in Example 8, indicating formation of a mixed chloro-bromo lithium boracite, $Li_4B_7O_{12}(Cl,Br)$. A Guinier x-ray pattern could be indexed on the basis of a face-centered cubic cell of unit dimension $a = 12.157A$ indicating by Vegard's law a Cl/Br atom ratio of 72/28.

Optical examination of these crystals showed them to be anisotropic at room temperature but isotropic after slight warming. Differential scanning calorimetry showed upon very gentle heating the presence of a single transition in this $Li_4B_7O_{12}(Cl,Br)$ boracite that peaked at about 31°C. Crystals of this composition gave a strong positive test for piezoelectricity when examined with a transmission-type piezoelectricity detector.

EXAMPLES 10–19

Lithium haloboracites having various proportions of Cl/Br were prepared in the same manner as described for Example 2 by mixing in each case 1.458 g. $LiBO_2 \cdot 2H_2O$, 1.785 g. $B_2O_3$, and 1.054 g. $H_3BO_3$ with the amount of LiCl and LiBr shown in Table III. Following extraction of the product with water, mixtures of crystals of varying growth habits and degrees of clarity were obtained. Clear crystals having an irregular shard-like habit generally proved to be $Li_2B_4O_7$ whereas those of cubic-like or polyhedral habit were observed by x-ray diffraction powder data to have patterns isotypic with the boracites $Li_4B_7O_{12}Cl$ and $Li_4B_7O_{12}Br$ and from their interplanar spacings to have unit cells intermediate in size between those of the two end members, indicating formation of the mixed chloro-bromo lithium boracites $Li_4B_7O_{12}(Cl,Br)$. Differential scanning calorimetry demonstrated the presence of a transition in these boracites. The temperature at which the maximum endotherm appears on upheat is indicated in the final column of Table III. These materials were all anisotropic below the indicated transition temperature. The conductivity and dielectric properties of a crystal from Example 12 are shown in FIG. 2, curve C and FIG. 3, curve D, respectively.

cating that the electronic component of the d.c. conductivity was no more than a thousanth of the ionic component. Thus the lithium ionic transport number is greater than 0.99 and the lithium haloboracites are useful as battery components.

EXAMPLE 21

Figure 4:
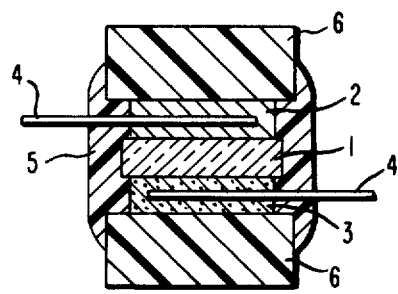

A primary battery comprising a lithium haloboracite solid electrolyte was constructed essentially as shown in FIG. 4. In this drawing 1 is a lithium haloboracite material; 2 is a lithium foil anode wrapped around a platinum wire 4; 3 is a cuprous sulfide cathodic layer compacted around a platinum wire; 5 is a commercial potting resin; and 6 is a mounting block of polymethylmethacrylate.

In this particular example the solid electrolyte was a crystal of $Li_4B_7O_{12}Cl_{0.68}Br_{0.32}$ as described in Example 12. After assembly of the two electrodes and mounting blocks around the crystal the "sandwich" was compressed to insure intimate contact, and while compressed, was hermetically sealed by the potting resin with only the platinum wire terminations exposed. The assembly produced an open cell voltage of 3.0 volts when measured by a high impedance voltmeter, and showed good shelf stability.

This configuration is a useful primary cell wherein a lithium haloboracite transports lithium ions between an electrode source of lithium and a cuprous sulfide electrode capable of reacting with lithium.

TABLE III $Li_4B_7O_{12}Cl_{1-n}Br_n$ Boracites

| | Reactants | | | Product | | |
|---|---|---|---|---|---|---|
| Example No | gLiCl | gLiBr | Atom Ratio Cl/Br | Cubic Cell Edge $a_o$ | Fraction Br n** | Transition Temp °C |
| 10 | 0.649 | 0.148 | 90/10 | 12.150 | 0.13 | 42 |
| 11 | 0.541 | 0.369 | 75/25 | — | — | 46 |
| 12 | 0.361 | 0.739 | 50/50 | 12.159 | 0.32 | 16 |
| 13 | 0.180 | 1.107 | 25/75 | — | — | 47 |
| 14 | 0.144 | 1.181 | 20/80 | 12.163* | 0.41 | 58 |
| 15 | 0.108 | 1.255 | 15/85 | 12.166* | 0.48 | 91 |
| 16 | 0.072 | 1.329 | 10/90 | 12.166* | 0.48 | 102 |
| 17 | 0.072 | 1.329 | 10/90 | 12.168* | 0.52 | 116 |
| 18 | 0.036 | 1.403 | 5/95 | 12.176* | 0.69 | 160 |
| 19 | 0.018 | 1.440 | 2.5/97.5 | — | — | 197 |

*values from cube root of rhombohedral cell volume
**from Vegard's law

EXAMPLE 20

The ionic transport of lithium through a lithium haloboracite was shown by the use of an electrochemical concentration cell. This cell was composed of (1) a saturated lithium amalgam in one leg and (2) a 0.1 saturated lithium amalgam (1 part saturated amalgam, 9 parts mercury) in the other leg. The two amalgams were separated by a crystal platelet of $Li_4B_7O_{12}Cl_{0.68}Br_{0.32}$ of Example 12. This cell produced an open circuit voltage of 68 mV measured by a high impedance voltmeter between electrodes in the two legs and showed a direct current conductance of about $10^{-7}$ ohms$^{-1}$.

When the solid electrolyte crystal was replaced by a liquid ionic conductor comprising $LiClO_4$ dissolved in an organic solvent the open circuit voltage was scarcely different (70 mV) indicating ionic conduction in the lithium haloboracite. Opposing surfaces of the crystal were then sputtered with gold and the direct current conductance now measured less than $10^{-10}$ohms$^{-1}$ indi- Although the invention has been described and exemplified by way of specific embodiments, it is not intended that it be limited thereto. As will be apparent to those skilled in the art, numerous modifications and variations of these embodiments can be made without departing from the spirit of the invention or the scope of the following claims.

The embodiments of the invention in which an exclusive property or privilege is claimed are defined as follows:

1. Lithium haloboracites of the formula $Li_4B_7O_{12}X$ wherein X is $I_{1-m}Br_m$ where $m$ is 0 to 0.5 or $Cl_{1-n}Br_n$ where $n$ is 0.2 to 0.5.

2. A lithium haloboracite of claim 1 of the formula $Li_4B_7O_{12}I$.

3. A lithium haloboracite of claim 1 of the formula $Li_4B_7O_{12}I_{1-m}Br_m$ where $m$ is 0 to 0.5.

4. A lithium haloboracite of claim 1 of the formula $Li_4B_7O_{12}Cl_{1-n}Br_n$ where $n$ is 0.2 to 0.5.

* * * * *